US012104020B2

(12) United States Patent
Gubbels et al.

(10) Patent No.: US 12,104,020 B2
(45) Date of Patent: Oct. 1, 2024

(54) SILICONE-BASED PRODUCTS AND THEIR APPLICATIONS

(71) Applicant: DOW SILICONES CORPORATION, Midland, MI (US)

(72) Inventors: Frederic Gubbels, Seneffe (BE); Victor Baily, Seneffe (BE)

(73) Assignee: Dow Silicones Corporation, Midland, MI (US)

( * ) Notice: Subject to any disclaimer, the term of this patent is extended or adjusted under 35 U.S.C. 154(b) by 287 days.

(21) Appl. No.: 17/767,888

(22) PCT Filed: Oct. 6, 2020

(86) PCT No.: PCT/US2020/054420
§ 371 (c)(1),
(2) Date: Apr. 9, 2022

(87) PCT Pub. No.: WO2021/071848
PCT Pub. Date: Apr. 15, 2021

(65) Prior Publication Data
US 2023/0104163 A1 Apr. 6, 2023

Related U.S. Application Data

(60) Provisional application No. 62/913,201, filed on Oct. 10, 2019.

(51) Int. Cl.
| B60C 19/00 | (2006.01) |
| B60C 5/08 | (2006.01) |
| C08G 77/04 | (2006.01) |
| C08G 77/18 | (2006.01) |
| C08K 3/04 | (2006.01) |

(52) U.S. Cl.
CPC ............... *C08G 77/18* (2013.01); *B60C 5/08* (2013.01); *C08K 3/04* (2013.01); *C08K 3/041* (2017.05); *C08G 2170/00* (2013.01); *C08G 2190/00* (2013.01); *C08G 2380/00* (2013.01); *C08K 2201/011* (2013.01); *C08K 2201/014* (2013.01)

(58) Field of Classification Search
CPC .... B60C 19/002; B29C 73/16; B29D 30/0685
See application file for complete search history.

(56) References Cited

U.S. PATENT DOCUMENTS

| 4,087,585 A | 5/1978 | Schulz |
| 4,359,078 A | 11/1982 | Egan |
| 5,194,649 A | 3/1993 | Okawa |
| 5,733,996 A | 3/1998 | De Buyl et al. |
| 6,512,072 B1 | 1/2003 | Gantner et al. |
| 6,642,309 B2 | 11/2003 | Komitsu et al. |
| 7,144,953 B2 | 12/2006 | Ueda et al. |
| 7,417,105 B2 | 8/2008 | Landon et al. |
| 7,893,170 B2 | 2/2011 | Wakioka et al. |
| 7,973,108 B2 | 7/2011 | Okamoto et al. |
| 8,030,371 B2 | 10/2011 | Chaussade |
| 8,231,944 B1 | 7/2012 | Schroeder |
| 8,609,797 B2 | 12/2013 | Knepper et al. |
| 8,686,094 B2 | 4/2014 | Djurdjevic et al. |
| 8,785,537 B2 | 7/2014 | Carrard et al. |
| 8,801,890 B2 | 8/2014 | Verosky et al. |
| 9,493,689 B2 | 11/2016 | Stanjek et al. |
| 9,527,985 B2 | 12/2016 | Okamatsu |
| 9,677,025 B2 | 6/2017 | Voge et al. |
| 9,732,203 B2 | 8/2017 | Okamatsu |
| 9,802,446 B2 | 10/2017 | Dahlke et al. |
| 10,150,888 B2 | 12/2018 | Simon et al. |
| 10,414,907 B2 | 9/2019 | Takahara |
| 10,717,870 B1 | 7/2020 | Gubbels et al. |
| 2006/0247349 A1 | 11/2006 | Kollmann et al. |
| 2009/0277549 A1 | 11/2009 | Tanno |
| 2010/0119715 A1 | 5/2010 | Sostmann et al. |
| 2010/0307655 A1 | 12/2010 | Tanno |
| 2015/0007938 A1 | 1/2015 | Stanjek et al. |
| 2015/0166859 A1 | 6/2015 | Choffat et al. |
| 2016/0001612 A1 | 1/2016 | Joo et al. |
| 2016/0009954 A1 | 1/2016 | Hanson |
| 2016/0340548 A1 | 11/2016 | Gubbels et al. |
| 2017/0015146 A1 | 1/2017 | Tyburski et al. |

(Continued)

FOREIGN PATENT DOCUMENTS

| CN | 105849213 A | 8/2016 |
| CN | 107207860 A | 9/2017 |

(Continued)

OTHER PUBLICATIONS

International Search Report for PCT/US2020/054420 dated Jan. 19, 2021, 4 pages.
Noll, W., "Chemistry and Technology of Silicones", Academic Press Inc., New York, 1968, pp. 397-399.
Brook, Michael A., "Silicon in organic, organometallic and polymer chemistry", John Wiley & Sons, Inc. (2000), pp. 285-287.

(Continued)

*Primary Examiner* — Cedrick S Williams
(74) *Attorney, Agent, or Firm* — Warner Norcross + Judd LLP

(57) ABSTRACT

There is provided silicone based materials with enhanced tackiness upon cure. These may be used for cured self-adhering silicone-based products such as pressure sensitive adhesives, self-adhering materials and/or self-sealing materials, made from condensation curable silicone-based compositions, the compositions therefor and to applications for which said self-adhesive products may be used. In one particular application the cured silicone based material may be utilised as a self-sealing layer in an inflatable article such as a pneumatic tire.

20 Claims, No Drawings

(56) References Cited

U.S. PATENT DOCUMENTS

| | | |
|---|---|---|
| 2017/0297281 A1 | 10/2017 | Yukawa et al. |
| 2017/0348929 A1 | 12/2017 | Badaroux |
| 2018/0009951 A1 | 1/2018 | Gubbels et al. |
| 2018/0079263 A1 | 3/2018 | Tyburski et al. |
| 2018/0086158 A1 | 3/2018 | Bauer |
| 2018/0117974 A1 | 5/2018 | Jacob et al. |
| 2018/0126803 A1 | 5/2018 | Jacob et al. |
| 2019/0177486 A1* | 6/2019 | Baily .................. C08K 5/57 |
| 2019/0177584 A1 | 6/2019 | Gubbels et al. |
| 2019/0338077 A1 | 11/2019 | Chambard et al. |
| 2020/0063009 A1 | 2/2020 | Detemmerman et al. |

FOREIGN PATENT DOCUMENTS

| | | |
|---|---|---|
| CN | 108289827 A | 7/2018 |
| CN | 109476919 A | 3/2019 |
| CN | 109642078 A | 4/2019 |
| EP | 2397314 A1 | 12/2011 |
| EP | 2554617 A2 | 2/2013 |
| EP | 2562009 A2 | 2/2013 |
| EP | 3227128 B1 | 2/2018 |
| WO | 2009013309 A1 | 1/2009 |
| WO | 2013131330 A1 | 9/2013 |
| WO | 2016060229 A1 | 4/2016 |
| WO | 2016120270 A1 | 8/2016 |
| WO | 2017001997 A1 | 1/2017 |
| WO | 2017163219 A1 | 9/2017 |
| WO | 2018024856 A1 | 2/2018 |
| WO | 2018024857 A1 | 2/2018 |
| WO | 2018024858 A1 | 2/2018 |
| WO | 2018024859 A1 | 2/2018 |
| WO | 2018024860 A1 | 2/2018 |
| WO | 2018024861 A1 | 2/2018 |
| WO | 2018024865 A1 | 2/2018 |
| WO | 2018050503 A1 | 3/2018 |
| WO | 2018200796 A1 | 11/2018 |
| WO | 2019027668 A1 | 2/2019 |

OTHER PUBLICATIONS

M. Mikrut et al., "Silicone Rubber Tack I: Relation to Network Structure", The Journal of Adhesion, (2009), 85:7, pp. 395-412.

* cited by examiner

SILICONE-BASED PRODUCTS AND THEIR APPLICATIONS

CROSS-REFERENCE TO RELATED APPLICATIONS

This application is the U.S. National Stage of International Application No. PCT/US2020/054420 filed on 6 Oct. 2020, which claims priority to and all advantages of U.S. Provisional Application No. 62/913,201 filed on 10 Oct. 2019, the content of which is incorporated herein by reference.

TECHNICAL FIELD

The present disclosure relates to enhancing the tackiness of cured self-adhering silicone-based products such as pressure sensitive adhesives, self-adhering materials and/or self-sealing materials, made from condensation curable silicone-based compositions, the compositions therefor and to applications for which said self-adhesive products may be used.

BACKGROUND

The tackiness of a silicone adherent e.g., a cured self-adhering silicone-based product such as a pressure sensitive adhesive, self-adhering material and/or self-sealing material, is the initial physical adhesiveness thereof towards a substrate to which it is to be adhered when they first come into contact, i.e., the initial "stickiness" between the two. Tackiness is influenced by physical adhesion forces that are highly dependent on (i) interactions due to dispersive interactions, e.g., via dispersive adhesion forces such as van der Waals and London forces, (ii) capillary interactions (wetting), (iii) mechanical adhesion due to interlocking, (iv) diffusion adhesion (interdiffusion) and (v) electrostatic adhesion (electric charges). However, in the case of silicone adherents adhering physically to non-silicone substrates, the tackiness is mainly governed by dispersive interactions (i), wetting (ii) and interlocking (iii).

Generally, the success of long term adhesion, between e.g., a cured silicone adherent and a substrate on to which it has been applied, is dependent on the level of chemical adhesion therebetween due to the subsequent formation of chemical bonding joining the silicone adherent to the substrate and the cohesive nature of the adherent itself. By cohesive nature, it is intended to mean its inner bond strength or ability to hold itself together. Silicone elastomeric materials are utilised in a wide variety of applications because they have excellent internal cohesive forces leading to being resistant to tearing.

Additives referred to as tackifiers are often provided in compositions which, when cured, are designed to provide a tacky surface. Tackifiers are chemical compounds introduced into an adherent composition to increase the tackiness thereof towards a substrate to which it is to be adhered. Examples of tackifiers include low-molecular weight compounds e.g., resins with high glass transition temperatures which increase the initial interactive forces of an adherent towards a substrate. They are believed to function by migrating to the surface of the adherent resulting in interactions with the substrate surface. However, tackifiers cannot easily migrate to the surface of silicone adherents because the surface tension of the compositions used is very low. Due to the flexibility of the silicone compositions, silicone slowly replaces the tackifier at the surface of the adherent, such that the adherent eventually exhibits the tackiness of the silicone as if the tackifier were not present.

Self-adhering materials and/or self-sealing materials are utilised in a wide variety of applications. For example, as pressure sensitive adhesives, as adherents on patches and in the provision of self—sealing pneumatic tires to allow a vehicle to continue to travel despite a considerable or complete loss of pressure in one or more tires, enabling a driver to take their vehicle to safe a breakdown point without having to stop, often in hazardous circumstances, to fit a spare tire.

Pneumatic tires are widely used due to their excellent shock absorbing property and ability to provide riding comfort in a vehicle. However, they are prone to puncture since they are inherently made of soft and flexible material including rubber. When a puncture occurs due to e.g., travelling over sharp foreign bodies such as nails, stones, glass fragments, the high-pressure air inside the tire leaks causing deflation, and the pneumatic tire cannot function properly. Historically the sole solution when a tire was punctured by a foreign body e.g., a nail, was the laborious need to replace the original tire with a spare tire.

Self-sealing pneumatic tires are designed to automatically re-seal a tire in the event of a puncture by a foreign body, such as a nail. Problems persist with the materials used to seal punctured self-sealing tires, these include lack of stability over time, lack of effectiveness under extreme operating temperature conditions and/or difficulties in manufacturing.

To be usable, a self-sealing layer designed to seal e.g., a puncture in a tire must be effective over a very wide range of operating temperatures and must function throughout the lifetime of the tire. It must be capable of closing off holes when the responsible puncturing object, which we call a "nail", remains in place. Upon expelling the nail, the self-sealing layer must be able to fill up the hole and make the tire airtight, especially under wintery conditions. Key properties, namely tensile strength, elongation and cross-link density or the storage modulus have been identified in the industry as particular pertinent for the function of a self-sealing layer.

Tensile strength refers to the maximum stress (force per unit area) that a specimen of sealant material can withstand before rupturing. Elongation measures the relative increase in length of a specimen of material at the point of rupture. Cross-link density is a molecular property which measures the concentration of cross-links present in that part of the sealant which has been cured into a three-dimensional cross-linked network. The storage modulus of a material is related to the cross-link density of the material. A high crosslink density will lead to a higher storage modulus and conversely a low crosslinked material will exhibit a low storage modulus.

If the tensile strength of a sealant is too low, the sealant will flow under typical tire operating conditions and will also "blow through" a puncture hole when a puncturing object is removed from the tire and fail to seal the hole.

The cross-link density of a polymeric sealant determines how strongly the sealant will resist permanent deformation. If the sealant has too high a cross-link density or storage modulus, it will be too resistant to permanent deformation, and the sealant will cap a puncturing object rather than form a tent, with the results described above. If the cross-link density or storage modulus is too low, centrifugal force will cause the sealant to creep or flow at elevated temperatures, resulting in insufficient sealant underlying the shoulder portion of the tire. Too low a cross-link density will also result in a low fatigue resistance for the sealant composition. Fatigue resistance is an important requirement for an effective tire sealant, most particularly in the situation where an object such as a nail enters a tire, and the tire is then used for a considerable time without the nail being removed. In a typical case, of course, a motorist will not even be aware of the nail's presence. Periodic contact between the punctured portion of the tire and the road will result in the nail flexing back and forth as the tire rotates. While the sealant may have formed a seal over or around the nail, the sealant itself will be continually stretched and relaxed, a process which over time will potentially cause the seal to fail and break the air seal.

Whilst WO2018024857 provides a condensation cured silicone product which, when used as a self-sealing layer in tires, overcomes the above issues, the compositions described therein may not be sufficiently tacky which remains an important requirement because when an object such as a nail enters a tire whose interior is coated with a self-sealing layer the material in the layer needs to be sufficiently tacky to adhere to the nail immediately and form a tent-like structure surrounding it. This initial adhesion of the sealant to the nail at this time will assist in preserving an air barrier at the puncture and will also result in the sealant being drawn by the nail into the puncture hole as the nail is removed.

SUMMARY

The following disclosure provides a condensation cured self-adhering silicone-based product with improved tackiness of silicone-based product without the use of a tackifier. In a first embodiment there is provided a condensation curable silicone-based composition comprising (i) an organopolysiloxane based polymer having not less than two silicon-bonded hydroxyl or hydrolysable groups per molecule and a viscosity of from 30,000 mPa·s to 200,000 mPa·s at 23° C.;

(ii) a cross-linker comprising a silyl functional polymer having at least 2 silyl groups, each silyl group containing at least two hydrolysable groups;

(iii) a condensation catalyst selected from the group of titanates and/or zirconates; and optionally (iv) a reinforcing or non-reinforcing filler;

which composition, upon cure, provides a self-adhering silicone-based product having an absolute tackiness of greater than or equal to (≥) 1.025, wherein Absolute Tackiness=−[tackiness strength(F−)]/[hardness strength(F+)].

In a second embodiment there is provided a condensation cured self-adhering silicone-based product obtained from curing a condensation curable silicone-based composition comprising (i) an organopolysiloxane based polymer having not less than two silicon-bonded hydroxyl or hydrolysable groups per molecule and a viscosity of from 30,000 mPa·s to 200,000 mPa·s at 23° C.;

(ii) a cross-linker comprising a silyl functional polymer having at least 2 silyl groups, each silyl group containing at least two hydrolysable groups;

(iii) a condensation catalyst selected from the group of titanates and/or zirconates; and optionally (iv) a reinforcing or non-reinforcing filler;

which condensation cured self-adhering silicone-based product has an absolute tackiness of ≥1.025, wherein Absolute Tackiness=−[tackiness strength(F−)]/[hardness strength(F+)].

The aforementioned condensation cured self-adhering silicone-based products exhibit high tackiness that will remain for a long period of time and therefore are useful for many potential applications, such as pressure sensitive adhesives, patches and/or anti-puncture materials for inflatable articles such as tires.

There is also provided herein an inflatable article provided with a self-sealing layer comprising said condensation cured self-adhering silicone-based product. The condensation curable silicone-based composition described above for the provision of said product has a viscosity, when uncured, that enables it to be incorporated into an inflatable article such as a tire during a tire building process and the resulting cured product is able to function as a self-sealing layer by being able to flow into and seal a puncture hole in the inflatable article e.g., a pneumatic tire.

DETAILED DESCRIPTION

In the case of tires, in use a pneumatic tire which comprises an outer or tread surface and an inner surface, is mounted on a wheel rim. Once assembled, the inner surface of the tire and the wheel rim define an inner annular cavity intended to be inflated to support the load on the tire. Such pneumatic tires are prone to puncture since they are inherently made of soft and flexible material including rubber. When a puncture occurs due to e.g., travelling over sharp foreign bodies such as nails, stones, glass fragments, unless prevented, the high pressure air in the inner annular cavity leaks causing deflation, and the pneumatic tire cannot function properly. A layer of condensation cured self-adhering silicone-based product described above can prevent or at least minimise this deflation effect by sealing the puncture.

The condensation curable silicone-based composition described above is generally stored in two or more parts prior to use. In the case of a two-part composition one part may contain a polymer (i) and filler (iv), when present, and the cross-linker (ii) and catalyst (iii) are kept separate from the filler (iv) in a curing agent. This is because filler (iv), when present, is utilised to provide the moisture required to activate the condensation cure in the bulk of the product. In the presence of such an amount of moisture during storage before use, alkyltitanate catalysts would potentially be inactivated as a result of being fully hydrolysed to tetrahydroxy titanates. The two-parts can be mixed in any suitable ratio, e.g., base part:curing agent from 15:1 to 1:1, alternatively 12:1 to 1:1, alternatively from 10:1 to 1:1. Typically the ratio of the two parts is dependent of the relative amounts of the ingredients contained in each part. The condensation curable silicone-based composition described above is generally designed to cure and/or be curable at room temperature.

Polymer (i) is at least one organopolysiloxane based polymer having not less than two silicon-bonded hydroxyl or hydrolysable groups per molecule and a viscosity of from 30,000 mPa·s to 200,000 mPa·s at 23° C. Any suitable organopolysiloxane based polymer may be utilised including polydialkyl siloxanes, alkylphenyl siloxane, siloxane copolymers or siloxane/organic copolymers with e.g., polyethers, acrylates or polyisobutylenes. In one alternative, polymer (i) is a polysiloxane based polymer containing at least two terminal silanol (Si—OH) containing groups. Examples of suitable silanol containing groups include —Si(OH)$_3$, —(R$^a$)Si(OH)$_2$, —(R$^a$)$_2$Si(OH), or —(R$^a$)$_2$Si—R$^c$—SiR$^d_p$(OH)$_{3-p}$ where each R$^a$ independently represents a monovalent hydrocarbyl group, for example, an alkyl group, in particular having from 1 to 8 carbon atoms, (and is preferably methyl); each R$^d$ group is independently an alkyl group in which the alkyl groups suitably have up to 6 carbon atoms; R$^c$ is a divalent hydrocarbon group having up to 12 carbon atoms e.g., ethylene or propylene, which may be interrupted by one or more siloxane spacers having up to six silicon atoms; and p has the value 0, 1 or 2.

Preferably polymer (i) has the general formula $$X^3\text{-}A\text{-}X^1 \qquad (1)$$

where X$^3$ and X$^1$ are independently selected from siloxane groups which terminate in hydroxyl containing groups and A is a siloxane based polymeric chain comprising siloxane groups and optionally organic groups, alternatively a siloxane polymeric chain.

Examples of silanol or hydroxyl-terminating groups X$^3$ or X$^1$ include —Si(OH)$_3$, —(R$^a$)Si(OH)$_2$, —(R$^a$)$_2$Si(OH), or —(R$^a$)$_2$Si—R$^c$—Si(R$^d$)$_p$(OH)$_{3-p}$ as defined above. Preferably the X$^3$ and/or X$^1$ terminal groups are hydroxydialkyl terminated, e.g., hydroxydimethyl terminated.

Examples of suitable siloxane groups in polymeric chain A of formula (I) are those which comprise a polydiorganosiloxane chain. Thus, polymeric chain A preferably includes siloxane units of formula (2)

$$-(R^5{}_sSiO_{(4-s)/2})- \qquad (2)$$

in which each R$^5$ is independently an organic group such as a hydrocarbyl group having from 1 to 10 carbon atoms optionally substituted with one or more halogen group such as chlorine or fluorine and s is 0, 1 or 2, typically the average value of s is about 2. Particular examples of groups R$^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups R$^5$ are methyl.

The polymers (i) of the above type have a viscosity of from 30,000 to 200,000 mPa·s, alternatively 45,000 to 175,000 mPa·s at 23° C., alternatively from 50,000 to 150,000 mPa·s at 23° C. measured by using a Brookfield cone plate viscometer (RV DIII) using the most appropriate spindle for the viscosity concerned, e.g., a CP-51 or CP-52 spindle at from 0.1 to 5 rpm.

Preferred polysiloxanes containing units of formula (2) are thus polydiorganosiloxanes having terminal, silicon-bound hydroxyl groups, otherwise referred to as silanol containing terminal groups (Si—OH). The polydiorganosiloxanes may be homopolymers or copolymers. Mixtures of different polydiorganosiloxanes having silanol containing terminal groups are also suitable.

Furthermore, the composition may contain polymers having one Si-hydroxyl (silanol) containing terminal group for example one —Si(OH)$_3$, —(R$^a$)Si(OH)$_2$, —(R$^a$)$_2$Si(OH), or —(R$^a$)$_2$Si—R$^c$—SiR$^d_p$(OH)$_{3-p}$ as defined above, e.g., a dialkylhydroxy terminated group and one unreactive terminal group e.g., a trialkyl terminated, i.e., trimethyl terminated group. Hence, polymer (i) may additionally comprise polydiorganosiloxanes which are partially dialkylhydroxy terminated and partially trialkyl terminated. The inclusion of such additional polymers can reduce modulus of elasticity of the resulting product after cure and/or improve adhesion to hard-to-adhere substrates. Such additional polymers (i) may be of an analogous viscosity to those previously described.

In accordance with the present invention polymeric chain A may alternatively be a copolymer with an organic based polymer such as a polyether, acrylate and polyisobutylene. In the case of polyethers the polymer chain is based on polyoxyalkylene based units. Such polyoxyalkylene units preferably comprise a linear predominantly oxyalkylene polymer comprised of recurring oxyalkylene units, (—C$_n$H$_{2n}$—O—) illustrated by the average formula (—C$_n$H$_{2n}$—O—)$_y$, wherein n is an integer from 2 to 4 inclusive and y is an integer of at least four. The number average molecular weight of each polyoxyalkylene polymer block or polymer may range from about 300 g/mol to about 10,000 g/mol. but can be higher. Moreover, the oxyalkylene units are not necessarily identical throughout the polyoxyalkylene monomer but can differ from unit to unit. A polyoxyalkylene block, for example, can be comprised of oxyethylene units, (—C$_2$H$_4$—O—); oxypropylene units (—C$_3$H$_6$—O—); or oxybutylene units, (—C$_4$H$_8$—O—); or mixtures thereof.

Other polyoxyalkylene units may include for example: units of the structure $$-[-R^e-O-(-R^f-O-)_w-Pn\text{-}CR^g{}_2\text{-}Pn\text{-}O-(-R^f-O-)_q-R^e]-$$

in which Pn is a 1,4-phenylene group, each R$^e$ is the same or different and is a divalent hydrocarbon group having 2 to 8 carbon atoms, each R$^f$ is the same or different and, is, an ethylene group or propylene group, each R$^g$ is the same or different and is, a hydrogen atom or methyl group and each of the subscripts w and q is a positive integer in the range from 3 to 30.

For the purpose of this application "substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

In one embodiment an additional polydiorganosiloxane polymer (ia) may be utilised. The additional polydiorganosiloxane polymer (ia) may be of a similar structure to polymer (i) but has a viscosity outside the viscosity range of polymer (i). In one alternative additional polydiorganosiloxane polymer (ia) has a viscosity of greater than (>) 200,000 mPa·s at 23° C. Additional polydiorganosiloxane polymer (ia) may be present in an amount of up to 70 weight % (wt. %) of the total weight of polymer (i) and additional polymer (ia), alternatively up to 50 wt. % of the total weight of polymer (i) and additional polymer (ia), alternatively up to 30 wt. % of the total weight of polymer (i) and additional polymer (ia), alternatively up to 10 wt. % of the total weight of polymer (i) and additional polymer (ia).

Polymer (i)+(ia) is preferably present in the composition an amount of from 60 wt. % to 90 wt. % of the composition, alternatively from 70 wt. % to 90 wt. %.

Crosslinkers (ii) are silyl functional polymers having at least 2 silyl groups per molecule, each silyl group containing at least two hydrolysable groups.

For the sake of the disclosure herein a silyl functional polymer is a silyl functional polymer containing two or more silyl groups, each silyl group containing at least two hydrolysable groups. Hence, a disilyl functional molecule comprises two silicon atoms each having at least two hydrolysable groups, where the silicon atoms are separated by an organic or siloxane polymeric backbone. Typically, the silyl groups on the disilyl functional molecule are be terminal groups.

For the avoidance of doubt the cross-linker is not a disilane where two silicon atoms are bonded directly to one another.

The hydrolysable groups attached to the silyl groups in cross-linker (ii) include acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and alkenyloxy groups (for example isopropenyloxy and 1-ethyl-2-methylvinyloxy). There are at least two hydrolysable groups attached to each silyl, alternatively there are three hydrolysable groups per silyl. In one alternative each hydrolysable group is an alkoxy group.

Suitable polymeric crosslinkers (ii) may have a similar polymeric backbone chemical structure to any of those described with respect to polymeric chain A as depicted in formula (1) above. However, in respect of cross-linker (ii) the polymer backbone may be a silicone backbone, an organic backbone or a silicone/organic copolymer backbone. In the case of such siloxane and/or organic based cross-linkers the molecular structure can be straight chained, branched, cyclic or macromolecular, i.e., a silicone or organic polymer chain bearing alkoxy functional end groups include polydimethylsiloxanes having at least one trialkoxy terminal where the alkoxy group may be a methoxy or ethoxy group.

In the case of siloxane-based cross-linkers (ii) the viscosity of the cross-linker will be within the range of from 0.5 mPa·s to 80,000 mPa·s at 23° C. using a Brookfield cone plate viscometer (RV DIII) utilising a cone plate (measured in the same manner as polymer (i)). Cross-linker (ii) may additionally comprise silyl functional molecules having at least 2 silyl groups, wherein at least one silyl group contains one hydrolysable group. Whilst any of the hydrolysable groups mentioned above are suitable it is preferred that the hydrolysable groups are alkoxy groups and as such the terminal silyl groups may have the formula such as —$R^a$Si($OR^b$)$_2$, —Si($OR^b$)$_3$, —$R^a{}_2$Si$OR^b$ or —($R^a$)$_2$Si—$R^c$—Si$R^d{}_p$($OR^b$)$_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl group having up to 6 carbon atoms; $R^c$ is a divalent hydrocarbon group which may be interrupted by one or more siloxane spacers having up to six silicon atoms; and p has the value 0, 1 or 2. For example $R^c$ might be an ethylene group or propylene group or the like. Typically, each terminal silyl group will have 2 or 3 alkoxy groups.

In one alternative each silyl group is a trialkoxysilyl group. When the silyl group is a dialkoxy group or monoalkoxy group the remaining groups are alkyl groups and/or aryl group, alternatively alkyl groups having from 1 to 6 carbons, alternatively methyl and/or ethyl, alternatively is methyl.

In one embodiment the terminal group may have the formula

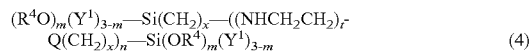

where $R^a$, $R^c$ and $R^d$ are as previously defined $R^b$ is an alkyl group having from 1 to 6 carbons, e.g., methyl and q is 0 or 1, alternatively q is 0.

In one embodiment the cross-linker (ii) may be a disilyl functional polymer, that is, a polymer containing two silyl groups, each containing at least two hydrolysable group such as described by the formula (4):

$$(R^4O)_m(Y^1)_{3-m}—Si(CH_2)_x—((NHCH_2CH_2)_t-Q(CH_2)_x)_n—Si(OR^4)_m(Y^1)_{3-m} \quad (4)$$

where $R^4$ is a $C_{1-10}$ alkyl group, $Y^1$ is an alkyl groups containing from 1 to 8 carbons, Q is a chemical group containing a heteroatom with a lone pair of electrons e.g., an amine, N-alkylamine or urea; each x is an integer of from 1 to 6, t is 0 or 1; each m is independently 1, 2 or 3 and n is 0 or 1.

Examples of disilyl polymeric crosslinkers (ii) with a silicone or organic polymer chain bearing alkoxy functional end groups include 1,6-bis (trimethoxysilyl)hexane (alternatively known as hexamethoxydisilylhexane HMSH), polydimethylsiloxanes having at least two trialkoxy terminal where the alkoxy group may be a methoxy or ethoxy group or bis (trialkoxysilylalkyl)amines, bis (dialkoxyalkylsilylalkyl)amine, bis (trialkoxysilylalkyl)N-alkylamine, bis (dialkoxyalkylsilylalkyl)N-alkylamine, bis (trialkoxysilylalkyl)urea, bis (dialkoxyalkylsilylalkyl) urea, bis (3-trimethoxysilylpropyl)amine, bis (3-triethoxysilylpropyl)amine, bis (4-trimethoxysilylbutyl)amine, bis (4-triethoxysilylbutyl)amine, bis (3-trimethoxysilylpropyl)N-methylamine, bis (3-triethoxysilylpropyl)N-methylamine, bis (4-trimethoxysilylbutyl)N-methylamine, bis (4-triethoxysilylbutyl)N-methylamine, bis (3-trimethoxysilylpropyl)urea, bis (3-triethoxysilylpropyl)urea, bis (4-trimethoxysilylbutyl)urea, bis (4-triethoxysilylbutyl)urea, bis (3-dimethoxymethylsilylpropyl)amine, bis (3-diethoxymethyl silylpropyl)amine, bis (4-dimethoxymethylsilylbutyl)amine, bis (4-diethoxymethyl silylbutyl)amine, bis (3-dimethoxymethylsilylpropyl)N-methylamine, bis (3-diethoxymethyl silylpropyl)N-methylamine, bis (4-dimethoxymethylsilylbutyl) N-methylamine, bis (4-diethoxymethyl silylbutyl)N-methylamine, bis (3-dimethoxymethylsilylpropyl)urea, bis (3-diethoxymethyl silylpropyl)urea, bis (4-dimethoxymethylsilylbutyl)urea, bis (4-diethoxymethyl silylbutyl)urea, bis (3-dimethoxyethylsilylpropyl)amine, bis (3-diethoxyethyl silylpropyl)amine, bis (4-dimethoxyethylsilylbutyl)amine, bis (4-diethoxyethyl silylbutyl)amine, bis (3-dimethoxyethylsilylpropyl)N-methylamine, bis (3-diethoxyethyl silylpropyl)N-methylamine, bis (4-dimethoxyethylsilylbutyl)N-methylamine, bis (4-diethoxyethyl silylbutyl)N-methylamine, bis (3-dimethoxyethylsilylpropyl)urea bis (3-diethoxyethyl silylpropyl)urea, bis (4-dimethoxyethylsilylbutyl)urea and/or bis (4-diethoxyethyl silylbutyl)urea; bis (triethoxysilylpropyl)amine, bis (trimethoxysilylpropyl)amine, bis (trimethoxysilylpropyl)urea, bis (triethoxysilylpropyl)urea, bis (diethoxymethylsilylpropyl)N-methylamine; di or trialkoxy silyl terminated polydialkyl siloxane, di or trialkoxy silyl terminated polyarylalkyl siloxanes, di or trialkoxy silyl terminated polypropyleneoxide, polyurethane, polyacrylates; polyisobutylenes; di or triacetoxy silyl terminated polydialkyl; polyarylalkyl siloxane; di or trioximino silyl terminated polydialkyl; polyarylalkyl siloxane; di or triacetonoxy terminated polydialkyl or polyarylalkyl. The cross-linker (ii) used may also comprise any combination of two or more of the above.

Cross-linker (ii) is preferably present in the composition an amount of from 1.0 wt. % to 10.0 wt. %, alternatively from 1 wt. % to 7.5 wt % of the composition.

In one embodiment the molar ratio of the total silanol groups (silicon bonded hydroxyl groups) to total hydrolysable groups in the composition is ≥0.5:1, alternatively ≥1:1, alternatively ≥2:1, alternatively from 2:1 to 4:1.

The total silicon bonded hydroxyl (Si—OH) molar content is calculated for 100 g of the mixed formulation. The total silicon bonded hydroxyl molar content related to a polymer is equal to the amount in g of hydroxyl containing polymer in 100 g of the mixed product divided by the number average molecular weight (Mn) of the polymer multiplied by the average number of hydroxyl functions present in the polymer, typically 2. If there are several hydroxyl functional polymers in the formulation, the sum of the molar content of each polymer is added up to constitute the total silicon bonded hydroxyl (Si—OH) molar content in the formulation.

The total hydrolysable groups molar content is calculated for 100 g of the mixed formulation. The molar content of hydrolysable groups related to a substance is equal to the amount in grams (g) of the molecule that contains the hydrolysable groups in 100 g of the mixed product divided by the molecular weight of the molecule or the number average molecular weight (Mn) in case it is a polymeric molecule multiplied by the average number of hydrolysable functions present in the molecule. The sum of the molar content of each molecule or polymer is added up to constitute the total molar content of hydrolysable groups in the formulation.

The molar ratio of total silicon bonded hydroxyl groups to total hydrolysable groups is then calculated by dividing the total molar content of total silicon bonded hydroxyl (Si—OH) groups by the total molar content of hydrolysable groups or can be depicted as a ratio.

The number average molecular weight (Mn) and weight average molecular weight (Mw) of silicone can also be determined by Gel permeation chromatography (GPC). This technique is a standard technique, and yields values for Mw (weight average), Mn (number average) and polydispersity index (PI) (where PI=Mw/Mn).

Mn value provided in this application have been determined by GPC and represent a typical value of the polymer used. If not provided by GPC, the Mn may also be obtained from calculation based on the dynamic viscosity of said polymer.

The composition further comprises a condensation catalyst. This increases the speed at which the composition cures. The catalyst chosen for inclusion in the composition depends upon the speed of cure required.

The catalyst is either a titanate catalyst or a zirconate catalyst. Titanate and/or zirconate based catalysts may comprise a compound according to the general formula Ti[OR$^{22}$]$_4$ or Zr[OR$^{22}$]$_4$ where each R$^{22}$ may be the same or different and represents a monovalent, primary, secondary or tertiary aliphatic hydrocarbon group which may be linear or branched containing from 1 to 10 carbon atoms. Optionally the titanate and/or zirconate may contain partially unsaturated groups. Examples of R$^{22}$ include but are not restricted to methyl, ethyl, propyl, isopropyl, butyl, tertiary butyl and a branched secondary alkyl group such as 2,4-dimethyl-3-pentyl. Alternatively, when each R$^{22}$ is the same, R$^{22}$ is an isopropyl, branched secondary alkyl group or a tertiary alkyl group, in particular, tertiary butyl. In one alternative the catalyst is a titanate. Suitable titanate examples include tetra n-butyl titanate, tetra t-butyl titanate, titanium tetrabutoxide and tetraisopropyl titanate. Suitable zirconate examples include tetra-n-propyl zirconate, tetra-n-butyl zirconate and zirconium diethylcitrate.

Alternatively, the titanate and/or zirconate may be chelated. The chelation may be with any suitable chelating agent such as an alkyl acetylacetonate such as methyl or ethyl acetylacetonate. Alternatively, the titanate may be monoalkoxy titanates bearing three chelating agents such as for example 2-propanolato, tris isooctadecanoato titanate or diisopropyldiethylacetoacetate titanate.

Catalyst (iii) is preferably present in the composition an amount of from 0.01 wt. % to 5.0 wt. %, alternatively 0.05 wt. % to 3.0 wt. % of the composition.

The composition herein may incorporate reinforcing and/or non reinforcing fillers (iv) or a combination thereof. Examples of finely divided, reinforcing fillers include high surface area fumed and precipitated silicas including rice hull ash and to a degree calcium carbonate. Examples of additional finely divided non-reinforcing fillers include crushed quartz, diatomaceous earths, barium sulphate, iron oxide, titanium dioxide, carbon black, glass beads, hollow glass beads, talc, wollastonite. Other fillers which might be used alone or in addition to the above include carbon nanotubes, e.g., multiwall carbon nanotubes, carbon fibres, aluminite, calcium sulphate (anhydrite), gypsum, calcium sulphate, barium titanate, magnesium carbonate, clays such as kaolin, aluminium trihydroxide, magnesium hydroxide (brucite), graphite, diamond, copper carbonate, e.g., malachite, nickel carbonate, e.g., zarachite, barium carbonate, e.g., witherite and/or strontium carbonate e.g., strontianite. Examples of anhydrous inorganic fillers include onyx; aluminium trihydrate, metal oxides such as aluminium oxide, beryllium oxide, magnesium oxide, zinc oxide; nitrides such as aluminium nitride and boron nitride; carbides such as silicon carbide and tungsten carbide; and combinations thereof.

Further examples of fillers include aluminium oxide, silicates from the group consisting of olivine group; garnet group; aluminosilicates; ring silicates; chain silicates; and sheet silicates. The olivine group comprises silicate minerals, such as but not limited to, forsterite and Mg$_2$SiO$_4$. The garnet group comprises ground silicate minerals, such as but not limited to, pyrope; Mg$_3$Al$_2$Si$_3$O$_{12}$; grossular; and Ca$_2$Al$_2$Si$_3$O$_{12}$. Aluminosilicates comprise ground silicate minerals, such as but not limited to, sillimanite; Al$_2$SiO$_5$; mullite; 3Al$_2$O$_3$.2SiO$_2$; kyanite; and Al$_2$SiO$_5$. The ring silicates group comprises silicate minerals, such as but not limited to, cordierite and Al$_3$(Mg,Fe)$_2$[Si$_4$AlO$_{18}$]. The chain silicates group comprises ground silicate minerals, such as but not limited to, wollastonite and Ca[SiO$_3$]. The sheet silicates group comprises silicate minerals, such as but not limited to, mica; K$_2$Al$_{14}$[Si$_6$Al$_2$O$_{20}$](OH)$_4$; pyrophyllite; Al$_4$[Si$_8$O$_{20}$](OH)$_4$; talc; Mg$_6$[Si$_8$O$_{20}$](OH)$_4$; serpentine for example, asbestos; Kaolinite; Al$_4$[Si$_4$O$_{10}$](OH)$_8$; and vermiculite. Any combination of two or more of the above fillers may be used.

When present in a preferred embodiment the fillers utilised are selected from fumed and precipitated silicas, calcium carbonate, carbon black, hollow glass beads and/or carbon nanotubes, e.g., multiwall carbon nanotubes, and mixtures thereof.

Optional filler (iv) is preferably present in the composition an amount of from 10 wt. % to 40 wt. %, alternatively 10 wt. % to 25 wt. %, alternatively 10 wt. % to 20 wt. % of the composition. When present the filler may be a hydrous filler, i.e., not anhydrous. Where required the quantitative amount of moisture (water) present in the filler may be determined by the extraction of moisture (water) from samples of the filler used in our compositions. using the test method of ISO787 2:1981.

In one embodiment, the molar ratio of catalyst M-OR functions, where M is titanium or zirconium and R is an alkyl group or chelate group, to the sum of moisture present in the filler, when present, as determined in accordance with ISO 787-2:1981, and total silicon bonded hydroxyl (silanol) groups is between 0.01:1 and 0.6:1. In one embodiment R is $R^{22}$ as defined above.

Filler Treating Agent

The optional reinforcing and/or non-reinforcing filler (iv) may, if present, be surface treated with a treating agent. Treating agents and treating methods are known in the art. The surface treatment of the filler(s) is typically performed, for example with a fatty acid or a fatty acid ester such as a stearate, or with organosilanes, organosiloxanes, or organosilazanes such as hexaalkyl disilazane or short chain siloxane diols. Generally, the surface treatment renders the filler(s) hydrophobic and therefore easier to handle and obtain a homogeneous mixture with the other components in the composition. Silanes such as

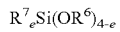

$$R^7_e Si(OR^6)_{4-e}$$

wherein $R^7$ is a substituted or unsubstituted monovalent hydrocarbon group of 6 to 20 carbon atoms, for example, alkyl groups such as hexyl, octyl, dodecyl, tetradecyl, hexadecyl, and octadecyl, and aralkyl groups such as benzyl and phenylethyl, with the alkyl groups of 6 to 20 carbon atoms being preferred. $R^6$ is an alkyl group of 1 to 6 carbon atoms, and letter e is equal to 1, 2 or 3 may also be utilised as the treating agent for fillers.

The presence of filler will be determined by the end use. For example, in the case of use of the product/composition for self-sealing inflatable articles such as tires, filler (iv) is most likely present to enhance the physical properties of the product, i.e., provide tensile strength, tear resistance as well as to prevent sagging during application.

Other than the above components optional components may be blended in the composition within a range such that the object of the present invention is achieved.

Examples of optional components include heat resistance-imparting agents, cold resistance-imparting agents, flame retarders, thixotropy-imparting agents, pigments, surfactants, flux agents, acid acceptors, protection agents, UV stabilizers, antioxidants, antiozonants, anti-corrosion additives, dyes and biocides or any suitable combination thereof.

Adhesion Promoter

Suitable adhesion promoters may comprise alkoxysilanes of the formula $R^{14}_h Si(OR^{15})_{(4-h)}$, where subscript h is 1, 2, or 3, alternatively h is 3. Each $R^{14}$ is independently a monovalent organofunctional group. $R^{14}$ can be an epoxy functional group such as glycidoxypropyl or (epoxycyclohexyl)ethyl, an amino functional group such as aminoethylaminopropyl or aminopropyl, a methacryloxypropyl, a mercapto functional group such as mercaptopropyl or an unsaturated organic group. Each $R^{15}$ is independently an unsubstituted, saturated hydrocarbon group of at least 1 carbon atom. $R^{15}$ may have 1 to 4 carbon atoms, alternatively 1 to 2 carbon atoms. $R^{15}$ is exemplified by methyl, ethyl, n-propyl, and iso-propyl.

Examples of suitable adhesion promoters include glycidoxypropyltrimethoxysilane and a combination of glycidoxypropyltrimethoxysilane with an aluminium chelate or zirconium chelate. Examples of adhesion promoters may be found in U.S. Pat. Nos. 4,087,585, 5,194,649. The curable composition may comprise, when present, 0.01% to 2 wt. %, alternatively 0.05 to 2 wt. %, alternatively 0.1 to 1 wt. % of adhesion promoter based on the weight of the composition. Preferably, the speed of hydrolysis of the adhesion promoter should be lower than the speed of hydrolysis of the cross-linker in order to favour diffusion of the molecule towards the substrate rather than its incorporation in the product network.

Surfactants

Suitable surfactants include silicone polyethers, ethylene oxide polymers, propylene oxide polymers, copolymers of ethylene oxide and propylene oxide, other non-ionic surfactants, and combinations thereof. The composition may comprise up to 0.05 wt. % of the surfactant based on the weight of the composition.

Flux Agent

The composition may comprise up to 2 wt. % of a flux agent based on the weight of the composition. Molecules containing chemically active functional groups such as carboxylic acid and amines can be used as flux agents. Such flux agents can include aliphatic acids such as succinic acid, abietic acid, oleic acid, and adipic acid; aromatic acids such as benzoic acids; aliphatic amines and their derivatives, such as triethanolamine, hydrochloride salts of amines, and hydrobromide salts of amines. Flux agents are known in the art and are commercially available.

Acid Acceptor

Suitable acid acceptors include magnesium oxide, calcium oxide, and combinations thereof. The composition may comprise up to 2 wt. % of acid acceptor based on the weight of the composition, if appropriate.

Anti corrosion additives, such as nitrogen/sulphur containing heterocyclic compounds containing a triazole structure, a thiadiazole structure, a benzotriazole structure, a mercaptothiozole structure, a mercaptobenzothiazole structure or a benzimidazole structure. When a two-part composition part A or the base part may comprise from 60 to 90 wt. % of polymer (i) and from 10 to 40 wt. % filler (iv), alternatively from 70 to 90 wt. % of polymer (i) and from 10 to 30 wt. % filler (iv), alternatively from 75 wt. % to 90 wt. % of polymer (i) and when present from 10 to 25 wt. % filler (iv). This will be adjusted in the case of other optional ingredients being included in Part A.

In one embodiment the product is made from a composition comprising
(i) an organopolysiloxane based polymer having not less than two silicon-bonded hydroxyl or hydrolysable groups per molecule and a viscosity of from 30,000 mPa·s to 200,000 mPa·s at 23° C. in an amount of from 60 wt. % to 90 wt. % of the composition, alternatively from 70 wt. % to 90 wt. % of the composition;
(ii) a cross-linker comprising a silyl functional polymer having at least two silyl groups, each silyl group containing at least two hydrolysable groups in an amount of from 1.0 wt. % to 10.0 wt. %, alternatively from 1 wt. % to 7.5 wt. % of the composition;
(iii) a condensation catalyst selected from the group of titanates and/or zirconates in an amount of from 0.01 wt. % to 5.0 wt. %, alternatively 0.05 wt. % to 3.0 wt. % of the composition; and optionally a reinforcing or non-reinforcing filler (iv); in an amount of from in an amount of from 10 wt. % to 40 wt. %, alternatively 10 wt. % to 25 wt. %, alternatively 10 wt. % to 20 wt. % of the composition; wherein the total weight % of the composition is 100 wt. % and providing upon cure the resulting product has an absolute tackiness of ≥1.025, wherein:

Absolute Tackiness=−[tackiness strength($F$−)]/[hardness strength($F$+)] or =−[$F$−]/[$F$+].

As discussed above, the composition as hereinbefore described is typically made from a condensation curable silicone-based composition which is stored in a two-part manner. The two-part compositions may be mixed using any appropriate standard two-part mixing equipment with a dynamic or static mixer and is optionally dispensed therefrom for use in the application for which it is intended.

In one embodiment, the composition is stored in two-parts where said parts may be divided as follows
  a) Polymer (i) and cross-linker (ii) in one part and polymer (i) and catalyst (iii) in the other part;
  b) cross-linker (ii) in one part and polymer (i) and catalyst (iii) in the other part or
  c) when more than one polymer (i) is being utilised a first polymer (i) and cross-linker (ii) in one part and a second polymer (i) and catalyst (iii) in the other part;
  d) polymer (i) in one part and the cross-linker (ii) and catalyst (iii) in the other part.

As discussed above, when filler (iv) is present, the filler (iv) and catalyst (iii) are kept separate during storage. Typically, when present, filler (iv) is mixed with polymer (i) in a base part which may also contain other additives and the catalyst (iii) is in a curing agent part, together with the cross-linker (ii).

As previously indicated, the condensation cured self-adhering silicone-based product obtained from the condensation curable silicone-based composition as hereinbefore described is required to have an absolute tackiness of ≥1.025, wherein:

Absolute Tackiness=−[tackiness strength($F$−)]/[hardness strength($F$+)] or =−[$F$−]/[$F$+].

Absolute tackiness is a measure of the ratio between the tackiness strength (F−) and the hardness strength (F+) determined using a suitable texture analyzer. The texture analyzer used in the examples herein was a Stable Micro Systems TA XT+ with a ½ inch (1.27 cm) hemisphere probe made of polyester set to penetrate a sample 5 mm at a speed of 0.1 mm/s. The hardness strength (F+) is the maximum "strength" measured during penetration of the probe and the tackiness strength (F−) and is the maximum "strength" measured during removal of the probe. The tackiness of a material is influenced by time and pressure of the contact body. A higher time or a higher pressure will result in a higher tackiness. Both time and surface area are constant during our measurement, but the force applied and therefore pressure applied will depends on the hardness of the sample. When tested a harder material will apply a higher pressure on the measuring probe, which may potentially "artificially" increase the measured strength (F−) when the probe is removed from the sample. In order to take into account this impact of the hardness, we define the absolute tackiness as the ratio between tackiness strength (F−) and the hardness strength (F+). In view of this the measurement of absolute tackiness using the formula provided above is relied upon. A cured material having an absolute tackiness value of greater than 1, alternatively ≥1.025 is characteristic of a material that exhibits a higher tackiness strength [F−] than the hardness strength [F+] and it was found that this is best achieved with the product of the composition described above with a polymer (i) having a viscosity in the range of from 30,000 mPa·s to 200,000 mPa·s at 23° C., alternatively 45,000 to 175,000 mPa·s at 23° C., alternatively from 50,000 to 150,000 mPa·s at 23° C. measured by using a Brookfield cone plate viscometer (RV DIII) using the most appropriate spindle for the viscosity concerned, e.g., a CP-51 or CP-52 spindle at from 0.1 to 5 rpm.

The condensation cured self-adhering silicone-based product obtained from the condensation curable silicone-based composition as hereinbefore described may be used in or as pressure sensitive adhesives, self-adhering materials and/or self-sealing materials, such as adherents on patches and in the provision of inflatable articles provided with a self-sealing layer comprising said condensation cured self-adhering silicone-based product.

In one embodiment the condensation cured self-adhering silicone-based product is utilised as a puncture self-sealing layer in an inflatable article. In one embodiment the inflatable article is a self-sealing pneumatic tire. The puncture self-sealing layer is provided on the inner surface of the tire so that when a puncture occurs due to e.g., travelling over sharp foreign bodies such as nails, stones, glass fragments, the product herein is able to seal the puncture hole made etc. to allow a vehicle to continue to travel despite a considerable or complete loss of pressure in one or more tires. This makes it possible, for example, to drive to a breakdown point without having to stop, often in hazardous circumstances, to fit a spare tire.

In order for the condensation cured self-adhering silicone-based product to be practical as a puncture self-sealing layer for a tire, it must also be formulated so that it can be easily and practically applied to the tire or article on which it is to be used. One method of applying the condensation curable silicone-based composition herein to the interior of a tire includes the steps of mixing the composition and spraying it into the tire interior as the tire is rotated. Some curing of the composition occurs as the tire is rotated due to the mixing of the two-parts of the composition, resulting in a uniform, seamless coating which resists running and pooling.

The condensation curable silicone-based composition as herein described is typically suited for application onto a post-vulcanised tire as no heat is required for curing.

In the present invention the condensation curable silicone-based composition is provided as a two-part composition. The two-part composition is mixed in a suitable mixing/dosing unit and the mixed composition is immediately applied onto the target substrate (tire) surface. Post mixing the composition is designed to have sufficient green strength to adhere to the tire inner surface and will cure after several hours.

Typically the two-part condensation curable silicone-based composition is applied in an uncured state and cures upon mixing and deposition on the substrate tire surface so as to have a cured thickness of between 0.25 and 10 mm, alternatively between 0.5 mm and 10 mm, alternatively between 1 and 5 mm, depending on the end use as discussed below. Subsequent to intermixing but prior to cure the condensation curable silicone-based composition may be applied on to a substrate using a suitable dispenser such as for example curtain coaters, spray devices die coaters, dip coaters, extrusion coaters, knife coaters and screen coaters which upon cure formation is provides a coating on said substrate.

The thickness and pressure requirements required for a self-sealing layer on a tire will vary depending on the end use of the tire concerned. Thus, for example, for tires of passenger vehicle type, it can have a thickness of at least 0.5 mm, preferably between 1 and 5 mm. According to another example, for tires for heavy duty or agricultural vehicles, the preferred thickness can lie between 1 and 6 mm. According to another example, for tires for vehicles in the field of earthmoving equipment or for aircraft, the preferred thickness can lie between 2 and 10 mm. Finally, according to another example, for bicycle tires, the preferred thickness can lie between 0.4 and 2 mm.

The condensation cured self-adhering silicone-based product derived from the two-part moisture curing silicone tire sealant composition described above is a tacky solid (at 23° C.) and is characterized in particular, thanks to its specific formulation, by a very high flexibility and deformability. One advantage of use of the composition as described herein is that the cured layer has the advantage of exhibiting, within a very wide range of operating temperatures for the tires, virtually no disadvantage in terms of rolling resistance in comparison with a tire not comprising a self-sealing layer. In comparison with non-silicone self-sealing compositions, the risks of excessive creep during use at relatively high temperature (typically greater than 60° C.), a temperature frequently encountered during the use of some tires, are notably reduced as silicone-based materials are more resistant to extreme temperature changes than many organic alternatives. Its self-sealing properties are also improved during use at low temperature (typically less than 0° C.).

Furthermore, the condensation cured self-adhering silicone-based product derived from the aforementioned condensation curable silicone-based composition has a storage modulus of between 9,000 and 26,000 Pa. A storage modulus comprised between these two values has been identified to provide the right balance between softness (tackiness to the nail or itself) and hardness (creep/flow resistance under pressure). A condensation curable silicone-based composition exhibiting such a storage modulus at 23° C. will exhibit a storage modulus at other temperatures, i.e., from 25 to 100° C., which still is compliant with the required balance of modulus to act as a self-sealing coating for tires.

If a foreign body, such as a nail, passes through the structure of the tire, the condensation cured self-adhering silicone-based product serving as self-sealing layer is subjected to several stresses. In reaction to these stresses, and thanks to its advantageous deformability and elasticity properties, said composition creates an impermeable contact zone around the body. It does not matter whether the contour or the profile of said body is uniform or regular, the flexibility of the self-sealing composition enables it to be insinuated into openings of very small size. This interaction between the self-sealing composition and the foreign body seals the zone affected by said body.

In the event of the foreign body being removed, whether accidentally or intentionally, a puncture hole remains, this being liable to create a relatively large leak, depending on its size. The condensation cured self-adhering silicone-based product, exposed to the hydrostatic pressure, is sufficiently soft and deformable to seal off, by being deformed, the puncture hole, preventing the inflation gas from leaking. In particular in the case of a tire, it has been shown that the flexibility of the self-sealing composition enables the forces of the surrounding walls to be withstood without any problems, even during phases in which the loaded tire deforms when running/rolling.

Whilst the above description has largely concentrated on the use of the composition with tires, it should be understood that the condensation cured self-adhering silicone-based product resulting from the previously described composition may be used as a puncture self-sealing layer in any type of "inflatable" article, that is to say, by definition, any article that takes its useable form when inflated with air. Examples of such inflatable articles include for the sake of example (but not restricted to) inflatable boats and balloons or balls used for games or sport. The two-part composition as described would be applied onto an internal wall of the inflatable article, completely or at least partly covering it.

The condensation cured self-adhering silicone-based product, is particularly well suited to use as a puncture self-sealing layer in a tire for a vehicles of the passenger type, SUVs (Sport Utility Vehicles), two-wheel vehicles (especially bicycles and motorcycles), aircraft, or industrial vehicles chosen from vans, "heavy" vehicles, i.e., underground trains, buses, road transport vehicles (lorries, tractors, trailers), off-road vehicles, such as agricultural or civil engineering machines, and other transport or handling vehicles.

EXAMPLES

Comparative Examples 1 and 2 Taken from WO2018024857

COMPARATIVE EXAMPLES

All viscosity measurements were made Brookfield cone plate viscometer RV DIII using the most appropriate cone plate at 23° C. unless otherwise indicated.

For the benefit of the examples the following commercially available tires were purchased and utilized for the comparative examples:

Bridgestone® Turanza ER300 205/55/16 91H,
Continental® Conti Premium Contact 5 205/55/16 91W,
Goodyear® Efficient Grip 205/55/16 91H,
Michelin® Energy Saver 205/55/16 91V, and
Pirelli® Cinturato P7 205/55/16 91V.

Preparation of Comparative base A 73.01 g of Nanocyl® NC 7000 carbon nanotubes, 3544.2 g of OH terminated polydimethylsiloxane exhibiting a viscosity of ca 50,000 mPa·s and an number average molecular weight (Mn) of 63,000 g/mol and 382.8 g of Trimethoxysilyl terminated polydimethylsiloxane exhibiting a viscosity of ca 56,000 mPa·s and an number average molecular weight (Mn) of 62,000 g/mol were added in a Neulinger 5 liter mixer. They were initially mixed for 2 minutes using a planetary mixer at 50 rpm, then for a further 15 minutes using the planetary mixer at 50 rpm and the disk at 700 rpm and finally for a further 30 minutes using the planetary mixer at 100 rpm and the disk at 700 rpm. The resulting base product was then unloaded into a pail.

Preparation of Base B 1500 g of Evonik® Printex A carbon black, 8825 g of OH terminated polydimethylsiloxane exhibiting a viscosity of ca 50,000 mPa·s and an number average molecular weight (Mn) of 63,000 g/mol and 973 g of Trimethoxysilyl terminated polydimethylsiloxane exhibiting a viscosity of ca 56,000 mPa·s and an number average molecular weight (Mn) of 62,000 g/mol were added in a 20 liter pail and was mixed 60 minutes with a Collomix Biax pail mixer.

Preparation of the Mixtures

Comparative Example 1

24.87 g of Trimethoxysilyl terminated polydimethylsiloxane having a viscosity of ca 56,000 mPa·s and an number average molecular weight (Mn) of 62,000 g/mol and 0.133 g of tetra n-butyl titanate were mixed together with a dental mixer at 2300 rpm for 30 seconds. 250 g of base A was introduced into a plastic container. The pre-mixture of trimethoxysilyl terminated polydimethylsiloxane (viscosity, 56,000 mPa·s) and tetra n-butyl titanate was added into the container and mixed for four periods of 30 seconds in a speed-mixer at 2300 rpm.

Comparative Example 2

28.85 g of Trimethoxysilyl terminated polydimethylsiloxane having a viscosity of ca 56,000 mPa·s and an number average molecular weight (Mn) of 62,000 g/mol and 0.155 g of tetra n-butyl titanate were mixed together with a dental mixer at 2300 rpm for 30 seconds. 290 g of base 2 was introduced into a plastic container. The pre-mixture of trimethoxysilyl terminated polydimethylsiloxane (viscosity, 56,000 mPa·s) and tetra n-butyl titanate was added into the container and mixed for four periods of 30 seconds in a speed-mixer at 2300 rpm.

Tabulated details of the compositions of Comparative examples 1 and 2 tested are provided in Table 1. The results of the test on the tires as run below are depicted in Tables 2a-c.

TABLE 1

Compositions

| Weight parts | Comp. Ex. 1 | Comp. Ex. 2 |
| --- | --- | --- |
| Part 1 - Base | | |
| OH terminated polydimethylsiloxane (viscosity ca 50,000 mPa · s) | 100 | 100 |
| Nanocyl NC 7000 carbon nanotubes | 2.06 | |
| Printex A carbon black | | 17 |
| Trimethoxysilyl terminated polydimethylsiloxane (viscosity ca 56,000 mPa · s) | 10.8 | 10.8 |
| Part 2 - Crosslinker and catalyst | | |
| Trimethoxysilyl terminated polydimethylsiloxane (viscosity ca 56,000 mPa · s) | 11.2 | 11.2 |
| tetra n-butyl titanate | 0.06 | 0.06 |
| SiOH/SiOR mol content | 1.46 | 1.37 |
| Cross-linker content (mmol/100 g) | 0.29 | 0.26 |

Evaluation of Hardness and Storage Modulus

A TA XT plus texture analyzer was used to monitor the hardness of the cured elastomer. The probe used is a polycarbonate cylinder terminated by a spherical end. The diameter of the probe and sphere is ½ inch (1.27 cm). A return to start program was used. The pre-test speed is 5 mm/s and the trigger force is 0.1 g. The test speed is 1 mm/s. the probe is inserted to a distance of 5 mm in the product and then removed to a distance where no significant force is measured. The maximum positive and negative force is measured and reported here. A higher positive force is representative of a harder elastomer. A higher negative force is representative of a tackier elastomer.

Evaluation of Sealing Efficiency

Holes of 3 mm diameter were cut on the rolling band of the tires with the help of a press and a cutting cylinder. The resulting product of Example 1, 2 and Comparative examples 1 and 2 were respectively filled into 310 ml cartridges and applied onto the inside of the tires and smoothed with a ruler at the designed thickness.

The products of Example 1, 2 and Comparative examples 1 and 2 were applied at the desired thickness to cover 3 holes in the tire without filling them. After 7 days of cure at 23° C. and 50% relative humidity the tires were mounted on wheels and pressurized at 1 bar (0.1 MPa). Nails of 5 mm diameter were pushed in the 3 mm holes to a distance of 40 mm inside the tire. The pressure was then increased to 2.7 bars (0.27 MPa) and the holes were removed from the tire.

In the following hours and days the leaking holes were filled with string repair plugs without cement, until no more leaks were observed, using optionally water to track leaks. The tires were kept for two weeks after repair. Results after 14 days without a loss of more than 0.1 bar (0.01 MPa) are reported in table 2. A 3/3 means that no leakage were observed on any of the 3 holes. 0/3 means that all three holes had to be repaired since they leaked.

TABLE 2a

Tire (5 mm thick coating)- Tightness of punctures after 2 weeks at 2.7 bars (0.27 MPa)

| | Comp. Ex. 1 | Comp. Ex. 2 |
| --- | --- | --- |
| Bridgestone | 3/3 | 3/3 |
| Continental | 3/3 | 3/3 |
| Goodyear | 3/3 | 3/3 |
| Michelin | 3/3 | 3/3 |
| Pirelli | 3/3 | 3/3 |

Comp. Examples 1 and 2 is showing excellent results for tightness, this shows that an appropriate crosslink density is required to obtain a product that will seal tires.

TABLE 2b

Tire (3 mm thick coating)- Tightness of punctures after 2 weeks at 2.7 bars (0.27 MPa)

| | Comp. Ex. 1 | Comp. Ex. 2 |
| --- | --- | --- |
| Bridgestone | 2/3 | 3/3 |
| Continental | 3/3 | 3/3 |
| Goodyear | 3/3 | 3/3 |
| Michelin | 3/3 | 0/3 |
| Pirelli | 2/3 | 3/3 |

TABLE 2c

Texture Analyser results and Absolute Tackiness

| | Comp. Ex. 1 | Comp. Ex. 2 |
| --- | --- | --- |
| F+ (g) | 210 | 217 |
| F− (g) | 100 | 93 |
| Absolute Tackiness | 0.48 | 0.45 |

Texture analyzer results of the examples indicate that a compromise in hardness and tackiness must be achieved for an appropriate performance in the tire. Comp. Example 1 and 2 exhibit an appropriate balance of hardness and tackiness to close the gap caused by the nail without exhibiting creep, however they have a low absolute tackiness and as such may suffer from tackiness issues with some foreign bodies and self-sealing punctures. However, it will be seen that each of the compositions used above had an absolute tackiness of <0.5 which is significantly less than those used herein.

Examples and Comparative Example 3 and 4

Preparation of the Bases

The base compositions for the five compositions assessed were prepared using 260.87 g of OH terminated polydimethyl siloxane exhibiting a viscosity at room temperature as indicated in Table 3 below was mixed with 39.13 g of Printex A type carbon black from Orion using a speedmixer for 4 times 30 seconds at a speed of 2300 rpm. During each mixing a spatula was used to homogenize the mixture.

TABLE 3

Viscosities of polymers used in Mixtures A to E

| Mixtures | Viscosity of polymer (mPa · s) at 23° C. | Method of determination of Viscosity |
|---|---|---|
| A | 13,500 | Brookfield cone plate viscometer RV DIII using a cone plate CP-52 at 5 rpm |
| B | 50,000 | Brookfield cone plate viscometer RV DIII using a cone plate CP-51 at 0.5 rpm |

TABLE 3-continued

Viscosities of polymers used in Mixtures A to E

| Mixtures | Viscosity of polymer (mPa · s) at 23° C. | Method of determination of Viscosity |
|---|---|---|
| C | 80,000 | Brookfield cone plate viscometer HBDVIII, Spindle CP-52 @ 5 RPM |
| D | 150,000 | Brookfield cone plate viscometer HB DVIII, Spindle CP-52 @ 1 RPM |
| E | 330,000 | Brookfield cone plate viscometer HB DVIII, Spindle CP-52 @ 1 RPM |

Preparation of the Curing Agent 313.04 g of Trimethoxysilyl terminated polydimethylsiloxane having a viscosity of ca 56,000 mPa at 23° C. (Brookfield cone plate viscometer RV DIII using a cone plate CP-52 at 3 rpm) was mixed with 1.25 g tetra n butoxy titanium using a speedmixer for 4 times 30 seconds at a speed of 2300 rpm.

Preparation of the Mixtures 300 g of the base prepared as described here above were mixed with 26.09 g of curing agent mixed for 4 times 30 seconds at a speed of 2300 rpm. During each mixing a spatula was used to homogenize the mixture. The mixed compound was then mixed for 4 times 30 seconds at a speed of 2300 rpm. During each mixing a spatula was used to homogenize the mixture. The mixture was introduced in a 310 ml cartridge and dispensed in excess in an aluminum cup of 50 mm diameter and 15 mm height. The product was tooled with a metallic plate to make a flat surface and then allowed to cure at room temperature for 28 days.

Results

A Stable Micro Systems TA XT plus texture analyzer was used to monitor the hardness of the cured elastomer. The probe used is a polycarbonate cylinder terminated by a spherical end. The Stable Micro Systems TA XT+ with a ½ inch (1.27 cm) hemisphere probe made of polycarbonate set to penetrate a sample 5 mm at a speed of 0.1 mm/s. in the product and then removed to a distance where no significant force is measured. The maximum positive [F+] and negative [F−] force is measured and reported here. A higher positive force is representative of a harder elastomer. A higher negative force is representative of a tackier elastomer. However, as the probe must penetrate 5 mm inside the product a harder material is also inducing a harder pressure on the probe and generally increase the negative force measured. In order to determine the absolute tackiness, the ratio of both values was calculated as follows:

$$\text{Absolute tackiness} = -[F-]/[F+]$$

TABLE 4

Results

| | Unit | A Comparative Example | B Example | C Example | D Example | E Comparative Example |
|---|---|---|---|---|---|---|
| Polymer viscosity | mPa · s | 13,500 | 50,000 | 80,000 | 150,000 | 330,000 |
| [F+] | g | 50 | 81 | 96 | 110 | 169 |
| [F−] | g | −39 | −96 | −141 | −124 | −172 |
| Absolute tackiness | none | 0.78 | 1.19 | 1.47 | 1.13 | 1.017 |

A ratio above 1 is characteristic of a material that exhibit a higher tackiness strength [F−] than the hardness strength [F+]. Mixture B, C and D are showing a ratio above 1, which means their absolute tackiness is higher than mixture A and E. In order to maximize absolute tackiness, it is preferable to use a polymer that exhibits a viscosity comprised in between 13,500 and 330,000 mPa·s in viscosity and more preferably in between 50,000 and 150,000 mPa·s.

A ratio above 1:1, alternatively above 1.025:1 is characteristic of a material that exhibit a higher tackiness strength [F−] than the hardness strength [F+]. Mixture B, C and D are showing absolute tackiness values above 1.025, which means their absolute tackiness is higher than mixture A and E. In order to maximize the absolute tackiness, it is therefore preferable to use a polymer that exhibits a viscosity comprised in between 13,500 and 330,000 mPa·s in viscosity and more preferably in between 50,000 and 150,000 mPa·s.

The invention claimed is:

1. A condensation curable silicone-based composition comprising:
   (i) an organopolysiloxane based polymer having not less than two silicon-bonded hydroxyl or hydrolysable groups per molecule and a viscosity of from 30,000 mPa·s to 200,000 mPa·s at 23° C.;
   (ii) a cross-linker comprising a silyl functional polymer having at least two silyl groups, each silyl group containing at least two hydrolysable groups; and
   (iii) a condensation catalyst selected from the group consisting of titanates, zirconates, and combinations thereof; and optionally
   (iv) one or more reinforcing or non-reinforcing filler(s);
   wherein upon cure, the composition provides a self-adhering silicone-based product having an absolute tackiness of ≥1.025, where absolute tackiness=−[tackiness strength (F−)]/[hardness strength (F+)]; and wherein component (ii) is present in the composition in an amount of from 1.0 wt. % to 10.0 wt. %.

2. A condensation curable silicone-based composition comprising:
(i) an organopolysiloxane based polymer having not less than two silicon-bonded hydroxyl or hydrolysable groups per molecule and a viscosity of from 30,000 mPa·s to 200,000 mPa·s 50,000 to 150,000 mPa·s at 23° C.;
(ii) a cross-linker comprising a silyl functional polymer having at least two silyl groups, each silyl group containing at least two hydrolysable groups; and
(iii) a condensation catalyst selected from the group consisting of titanates, zirconates, and combinations thereof; and optionally
(iv) one or more reinforcing or non-reinforcing filler(s);
wherein upon cure, the composition provides a self-adhering silicone-based product having an absolute tackiness of ≥1.025, where absolute tackiness=–[tackiness strength (F–)]/[hardness strength (F+)];
wherein the composition is stored in two-parts, i) a base part comprising polymer (i) and fillers (iv), when present, and ii) a curing part comprising cross-linker (ii) and catalyst (iii); and
wherein the base part excludes component (ii).

3. A condensation curable silicone-based composition comprising:
(i) an organopolysiloxane based polymer having not less than two silicon-bonded hydroxyl or hydrolysable groups per molecule and a viscosity of from 50,000 to 150,000 mPa·s at 23° C.;
(ii) a cross-linker comprising a silyl functional polymer having at least two silyl groups, each silyl group containing at least two hydrolysable groups; and
(iii) a condensation catalyst selected from the group consisting of titanates, zirconates, and combinations thereof; and optionally
(iv) one or more reinforcing or non-reinforcing filler(s);
wherein upon cure, the composition provides a self-adhering silicone-based product having an absolute tackiness of ≥1.025, where absolute tackiness=–[tackiness strength (F–)]/[hardness strength (F+)].

4. The condensation curable silicone-based composition in accordance with claim 3, wherein the molar ratio of total silicon bonded hydroxyl groups to total hydrolysable groups is >2:1.

5. The condensation curable silicone-based composition in accordance with claim 3, wherein the composition is stored in two-parts, i) a base part comprising polymer (i) and filler(s) (iv), when present, and ii) a curing part comprising cross-linker (ii) and catalyst (iii).

6. The condensation curable silicone-based composition in accordance with claim 3, wherein polymer (i) additionally comprises polydiorganosiloxanes which have one silanol containing terminal group and one unreactive terminal group.

7. The condensation curable silicone-based composition in accordance with claim 3, wherein cross-linker (ii) additionally comprises silyl functional molecules having at least two silyl groups, where at least one silyl group contains one hydrolysable group.

8. The condensation curable silicone-based composition in accordance with claim 3, wherein filler(s) (iv) is present and selected from the group consisting of fumed silicas, precipitated silicas, calcium carbonate, carbon black, hollow glass beads, carbon nanotubes, and combinations thereof.

9. The condensation curable silicone-based composition in accordance with claim 8, wherein filler(s) (iv) comprises multiwall carbon nanotubes and/or carbon black.

10. An inflatable article comprising:
an outer surface and an inner surface; and
a self-sealing silicone layer applied on the inner surface;
wherein the self-sealing silicone layer is cured from the silicone self-sealing composition in accordance with claim 3.

11. The inflatable article in accordance with claim 10, which is a self-sealing pneumatic tire.

12. A condensation cured self-adhering silicone-based product obtained from the condensation curable silicone-based composition in accordance with claim 3.

13. The inflatable article in accordance with claim 12, which is a pneumatic tire.

14. An inflatable article comprising the condensation cured self-adhering silicone-based product in accordance with claim 12.

15. The condensation cured self-adhering silicone-based product in accordance with claim 14, wherein the product is a pressure sensitive adhesive, a self-adhering material, and/or a self-sealing material.

16. The condensation cured self-adhering silicone-based product in accordance with claim 14, as a puncture self-sealing layer in an inflatable article.

17. The condensation cured self-adhering silicone-based product in accordance with claim 16, wherein the inflatable article is a self-sealing pneumatic tire.

18. The condensation cured self-adhering silicone-based product in accordance with claim 17, wherein the self-sealing pneumatic tire comprises:
a) a tire body having an outer tread surface and an inner surface; and
b) a puncture self-sealing layer of the condensation cured self-adhering silicone-based product adhered to the inner surface.

19. The condensation cured self-adhering silicone-based product in accordance with claim 18, wherein the puncture self-sealing layer has a thickness of greater than 0.3 mm.

20. The condensation cured self-adhering silicone-based product in accordance with claim 18, wherein the puncture self-sealing layer has a thickness of between 0.5 mm and 10 mm.

* * * * *